US009244927B1

(12) United States Patent  (10) Patent No.: US 9,244,927 B1
Ravan  (45) Date of Patent: Jan. 26, 2016

(54) SYSTEM AND METHOD FOR RECORD LEVEL MULTIPLEXING OF BACKUP DATA TO STORAGE MEDIA

(75) Inventor: Daniel Ravan, Fremont, CA (US)

(73) Assignee: EMC CORPORATION, Hopkinton, MA (US)

( * ) Notice: Subject to any disclaimer, the term of this patent is extended or adjusted under 35 U.S.C. 154(b) by 946 days.

(21) Appl. No.: 12/242,418

(22) Filed: Sep. 30, 2008

(51) Int. Cl.
    *G06F 17/30* (2006.01)
(52) U.S. Cl.
    CPC .............................. *G06F 17/30073* (2013.01)
(58) Field of Classification Search
    CPC ................... G06F 17/30073; G06F 17/30138
    USPC ................................................. 707/640, 642
    See application file for complete search history.

(56) References Cited

U.S. PATENT DOCUMENTS

| | | | |
|---|---|---|---|
| 6,212,568 B1 * | 4/2001 | Miller et al. .................. 709/236 |
| 6,320,865 B1 * | 11/2001 | Agrawala et al. ............. 370/413 |
| 6,813,657 B2 * | 11/2004 | Kyoung .......................... 710/52 |
| 7,315,923 B2 * | 1/2008 | Retnamma et al. ........... 711/162 |
| 7,725,437 B2 * | 5/2010 | Kirshenbaum et al. ....... 707/640 |
| 7,814,074 B2 * | 10/2010 | Anglin et al. .................. 707/692 |
| 7,861,050 B2 * | 12/2010 | Retnamma et al. ........... 711/162 |
| 8,031,717 B2 * | 10/2011 | Sato et al. ...................... 370/394 |
| 8,131,964 B2 * | 3/2012 | Retnamma et al. ........... 711/162 |
| 8,284,845 B1 * | 10/2012 | Kovacevic et al. ....... 375/240.26 |
| 8,417,908 B2 * | 4/2013 | Retnamma et al. ........... 711/162 |
| 8,468,082 B2 * | 6/2013 | Doornebos et al. ......... 705/36 R |
| 2002/0025003 A1 * | 2/2002 | Kyoung .................... 375/240.26 |
| 2003/0131117 A1 * | 7/2003 | Jones et al. ..................... 709/230 |
| 2003/0204555 A1 * | 10/2003 | Jones et al. ..................... 709/200 |
| 2003/0210711 A1 * | 11/2003 | Faust et al. ..................... 370/474 |
| 2004/0205224 A1 * | 10/2004 | Jones et al. ..................... 709/231 |
| 2005/0204058 A1 * | 9/2005 | Philbrick et al. ............... 709/238 |
| 2005/0246510 A1 * | 11/2005 | Retnamma et al. ........... 711/162 |
| 2005/0278459 A1 * | 12/2005 | Boucher et al. ............... 709/250 |
| 2006/0224846 A1 * | 10/2006 | Amarendran et al. ........ 711/162 |
| 2007/0058564 A1 * | 3/2007 | Agrawala et al. ............. 370/252 |
| 2008/0091894 A1 * | 4/2008 | Retnamma et al. ........... 711/161 |
| 2009/0198713 A1 * | 8/2009 | Sato et al. ...................... 707/100 |
| 2009/0234892 A1 * | 9/2009 | Anglin et al. .................. 707/201 |
| 2009/0271454 A1 * | 10/2009 | Anglin et al. .................. 707/204 |
| 2010/0100530 A1 * | 4/2010 | Nadathur et al. .............. 707/640 |
| 2010/0299311 A1 * | 11/2010 | Anglin et al. .................. 707/640 |

\* cited by examiner

*Primary Examiner* — James Trujillo
*Assistant Examiner* — Hubert Cheung
(74) *Attorney, Agent, or Firm* — Dergosits & Noah LLP; Todd A. Noah

(57) ABSTRACT

A system and method for efficiently creating a backup volume that is also efficient to recover is described. The backup volume may be created with one save set per media record by utilizing record level multiplexing rather than chunk level multiplexing. Through the use of multiple circular buffers, with each buffer associated with a respective save set, save sets written to storage media are contiguous and individual save set chunks are not separated by chunk headers within the respective media record. Recovery is therefore more efficient since the step of reading chunk headers and locating all the chunks for a save set is no longer required.

13 Claims, 4 Drawing Sheets

SYSTEM AND METHOD FOR RECORD LEVEL MULTIPLEXING OF BACKUP DATA TO STORAGE MEDIA

FIELD

The present invention relates generally to data backup, and specifically, to multiplexing a save set of backup data to storage media.

BACKGROUND

In a large organization, data from multiple backup clients are typically backed up for retention and security purposes. Backup clients include desktop computers, servers, networked storage devices and other data stores that can contain large amounts of data. The backup process is usually managed by a backup and recovery application ("BURA") resident on a dedicated backup or BURA server. In a typical backup operation, data selected for backup will be transmitted over a network from the backup clients to the BURA server, and then from the BURA server to the storage media, which may be tape or disk. Each set of client data selected for backup is known as a "save set." For example, all the data selected for backup from a desktop computer may be one save set; all the data selected for backup from a server may be another save set; a single database on a networked storage device may be another save set; and so forth. A backup process may involve backing up many of these save sets and will usually require the transmission of many large save sets over the network.

A. Chunk Level Multiplexing

Transmitting large save sets can cause significant strain on the network. Current methods for relieving network congestion include a process known as "chunk level multiplexing," which involves packaging save sets into more manageable sizes before transmitting or "streaming" them over the network to the backup server. These packages are known as data chunks, or simply, "chunks." Thus, instead of transmitting backup data as a large save set and potentially overwhelming the network, the save set will be transmitted as chunks, allowing the chunks to reach the BURA server using the most efficient path on the network. Since the multiplexing occurs during the chunk step of the backup process, it is known as "chunk level multiplexing."

As previously discussed, a backup process typically involves many save sets. Each save set will therefore be packaged into chunks and streamed to the BURA server. As a result, chunks from different save sets may reach the BURA server at the same time. The BURA server will temporarily store the chunks in a buffer on the BURA server before writing them to storage media. In order to identify the chunks' originating save set, the BURA will also create metadata for each chunk. Each chunk's metadata will later be written into a header ("chunk header") that will physically precede the chunk on the storage media. Chunk headers may be created and associated with each respective chunk during the buffering step.

The buffering step will typically involve a single circular buffer 201, shown in FIG. 2. A person having skill in the art will appreciate that a circular buffer is a type of data structure comprised of at least two data blocks. As data is added to one data block, data may be removed from the other data block. In the case of a backup process, the removal of data from the circular buffer is known as "flushing." In other words, once a data block in the circular buffer has been filled with data chunks (and their respective chunk headers), the buffer will flush the chunks for recording on the storage media. While one block is being flushed, the BURA may add data chunks and chunk headers to another block on the circular buffer 201. In this fashion, circular buffer 201 allows for a continuous cycle of filling and flushing of its data blocks. This process of filling and flushing is generally controlled and managed by the BURA.

Backup storage media includes both tape and disk media, both of which may be further divided into units called "media records." As noted previously, the circular buffer 201 may also be comprised of units called data blocks. Usually, a data block on circular buffer 201 will be the same size as a media record. As shown in FIG. 2, one circular buffer data block has been flushed and written to media record 205, and another circular buffer data block has been flushed and written to media record 207. Media record 205 is preceded by a record header 203, which may contain metadata or information on the chunks in media record 205. Media record 205 contains a number of data chunks 211 and 213, each of which corresponds to a different save set. Media record 207 contains data chunks 215 and 217. Note that chunk 215 is from a different save set, but chunk 217 is from the same save set as chunk 211. The separation of chunks 217 and 211 is due to the chunk level multiplexing discussed above. Also shown are chunk headers 210, 212, 214 and 216 that each correspond to the data chunk it precedes. For example, chunk header 210 precedes and contains information for chunk 211; chunk header 212 precedes and contains information for chunk 213; and so on. In some cases, metadata for the chunk may also antecede the chunk, but in either case, chunks from one save set are physically separated from other chunks from the same save set. FIG. 2 therefore shows that not only are save sets chunks separated from one another on the storage media (211 and 217), but each chunk is also further separated by chunk headers.

While this is an efficient method for ensuring all save sets are streamed and written to backup storage media, the result of this process can complicate recovery. Recovery typically involves recovery and restoration of an entire save set, as opposed to individual chunks within the recorded save set. When the BURA server receives a request to recover a save set, the BURA must locate all of the chunks associated with that save set on the storage media before the save set can be recovered. This requires navigating to each and every media record 205 on the storage media and reading each chunk header to identify the respective chunk's originating save set. This is a tedious process that slows recovery and taxes BURA resources.

What is therefore needed is a more efficient way to transmit data for backup to a storage device that also improves the recovery process.

BRIEF DESCRIPTION OF THE FIGURES

The present invention is illustrated by way of example and not limitation in the figures of the accompanying drawings, in which like references indicate similar elements, and in which.

DETAILED DESCRIPTION

The present invention is a system and method for "record level multiplexing" that improves over previous methods that multiplex at the chunk level. The present invention involves multiplexing at the buffering and recording steps of the backup process, rather than at the transmitting step. Record level multiplexing ensures that a save set's data chunks are written to storage media such that the storage media record contains chunks from one save set, and such that each chunk is not be separated by a chunk header. Instead, each media record will be preceded with a single record header that identifies the save set contained in the media record. This is an improvement over previous methods that result in save set chunks that are physically separated by chunk headers on the storage media. As will be discussed further below, this improves the recovery process without compromising the backup process.

Figure 1:
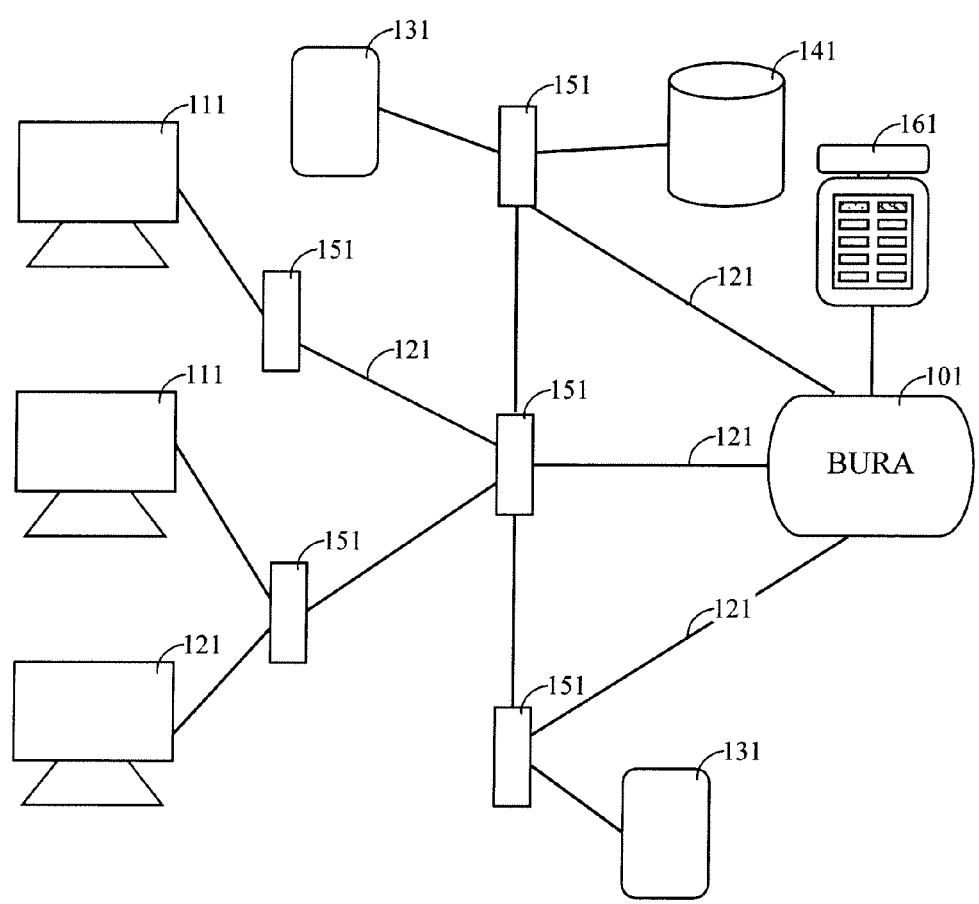
FIG. 1 is an exemplary block diagram depicting an embodiment of the present invention.

The present invention may be implemented by any backup network environment. For example, as illustrated in FIG. 1, the present invention may be managed by a BURA server 101, which contains the BURA software application and is connected to a network 121. One or more desktop computers 111 storing data for backup may also be connected to the network 121. Additionally, one or more servers 131 storing data for backup may be connected to the network 121. Further, one or more storage devices 141 may be connected to the network 121. There may be one or more network switches or routers 151 directing network traffic on network 121. The software application on BURA server 101 may manage the backup of data stored on backup clients, such as desktop computers 111, servers 131 or networked storage devices 141. A backup client's data will be packaged for backup, streamed to the BURA server 101 and written to storage media housed in storage array 161, which may be a tape library, disk array, or a combination of the two.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

Figure 2:
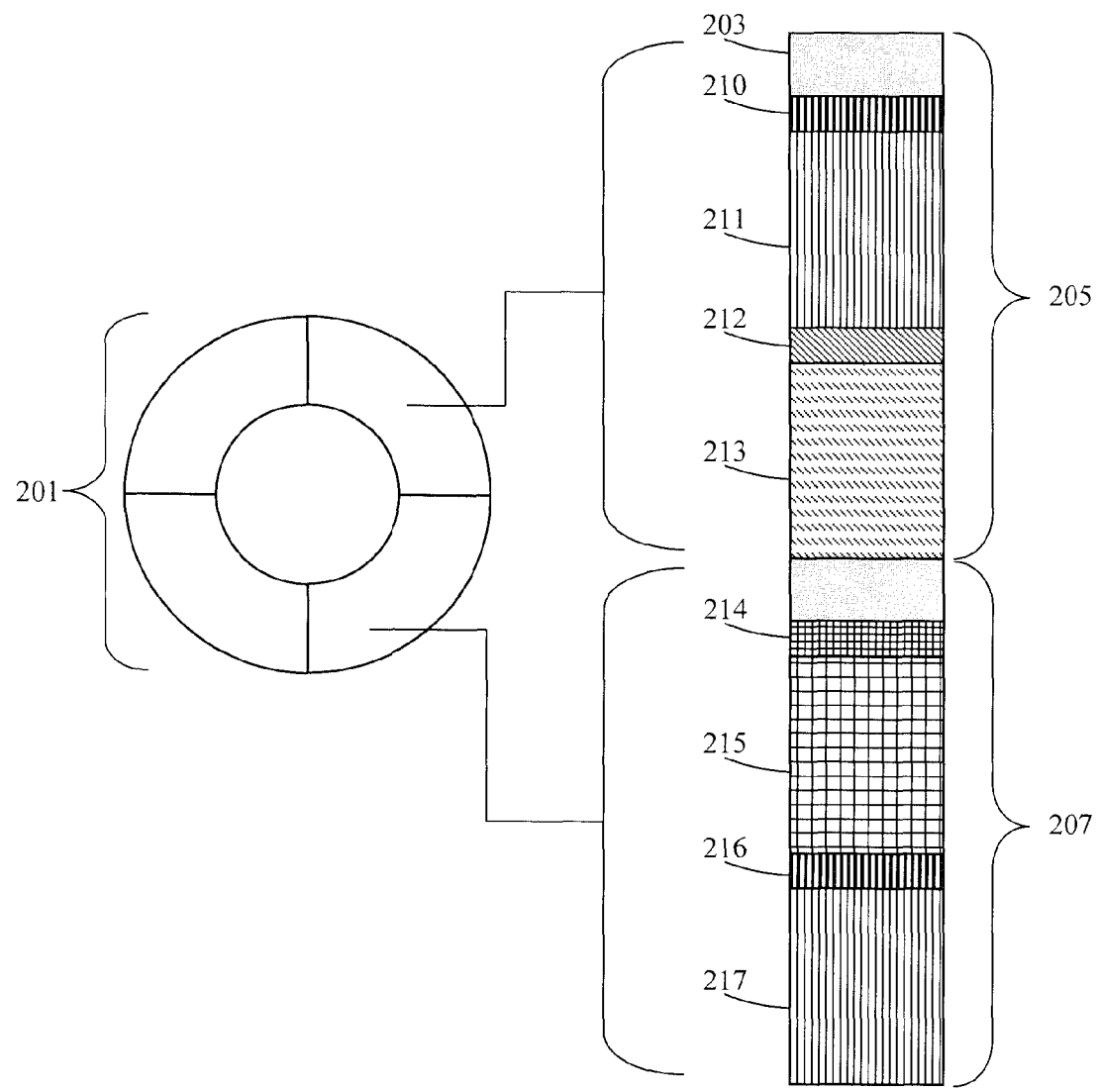
FIG. 2 is an exemplary block diagram depicting data on storage media stored using a prior art method.

As noted previously, a backup process will typically involve the transmission and storage of a number of different save sets packaged as chunks that are transmitted to BURA server 101 and recorded onto storage media in a media record 205. In the prior art, a media record 205 may contain chunks from different save sets, and each chunk may be separated by its respective chunk header, as shown in FIG. 2.

A. Record Level Multiplexing

The present invention is a method that avoids separating chunks by chunk headers on the storage media by multiplexing at the record level rather than the chunk level. In an embodiment, the present invention is a method whereby multiple circular buffers are used to temporarily store each save set's chunk data before flushing and writing the data to the storage media. As will be discussed further below, this improves over prior art backup methods where only one circular buffer is used, and/or chunks from different save sets are stored in the same circular buffer.

Figure 3:
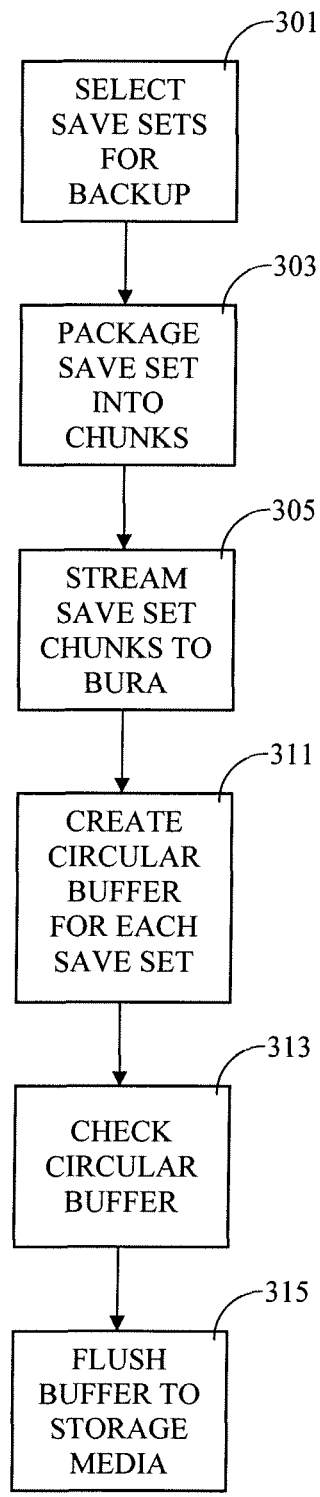
FIG. 3 is an exemplary flow diagram illustrating the steps of an embodiment of the present invention.

FIG. 3 illustrates an embodiment of the method of the present invention. In step 301, data from multiple desktop computers 111, servers 131 or network storage devices 141 are selected for backup. Each backup client's data will comprise a save set. In step 303, each save set may be packaged into chunks for transmission over network 121. Once a save set is packaged as chunks, in step 305 the chunks are transmitted or streamed to BURA server 101. The BURA software application on BURA server 101 will create a circular buffer for each save set (step 311). The circular buffer may behave similarly to circular buffer 201 described in the prior art chunk level multiplexing method; however, the circular buffer used in the present invention will only contain chunks from one save set. By creating and using a circular buffer for each save set, the present invention ensures that when that circular buffer is flushed, only one save set is streamed to the storage media at a time. In this fashion, save set chunks are kept together on the storage media, rather than fragmented and separated by chunk headers on the storage media as is presently done. In order to identify the save set from which the chunks originate, the BURA may create a record header that may precede the save set chunks on the storage media. As such, a media record will contain one save set comprised of the save set's chunks as they were transmitted, but the media record will only contain a single record header, instead of multiple chunk headers as is presently done.

One skilled in the art will appreciate that the use of multiple circular buffers maintains or even increases the efficiency of the backup operation. The previous method step of transmitting save sets as chunks may be performed, thereby controlling network congestion. Data chunks are not grouped (or re-grouped) by their originating save sets until after transmission to the BURA server. As discussed in step 311, chunks are held in circular buffers grouped by their originating save set before they are recorded onto media blocks on the storage media. Because there are multiple circular buffers, the BURA will be equipped to receive and store more save sets than in prior art methods that utilize a single circular buffer.

In step 313, the BURA server may check to see if the save set is completely written to its respective circular buffer, or will check to see if a block on the circular buffer is full. If a circular buffer block is full, it will flush that block's contents for recording on the storage media (step 315). Once the circular buffer's block has flushed, the BURA server will check to see if the save set has been completely written to the storage media. If not, then as the circular buffer removes its contents it will continuously store more of that save set's chunks. This will continue until the save set is completely streamed and written to the storage media. Alternatively, the circular buffer may be designed to withhold flushing until it has been completely filled, at which point it will flush its contents. After the save set is completely flushed and recorded on the storage media, the circular buffer may be re-used for another save set or may be deleted.

Figure 4:
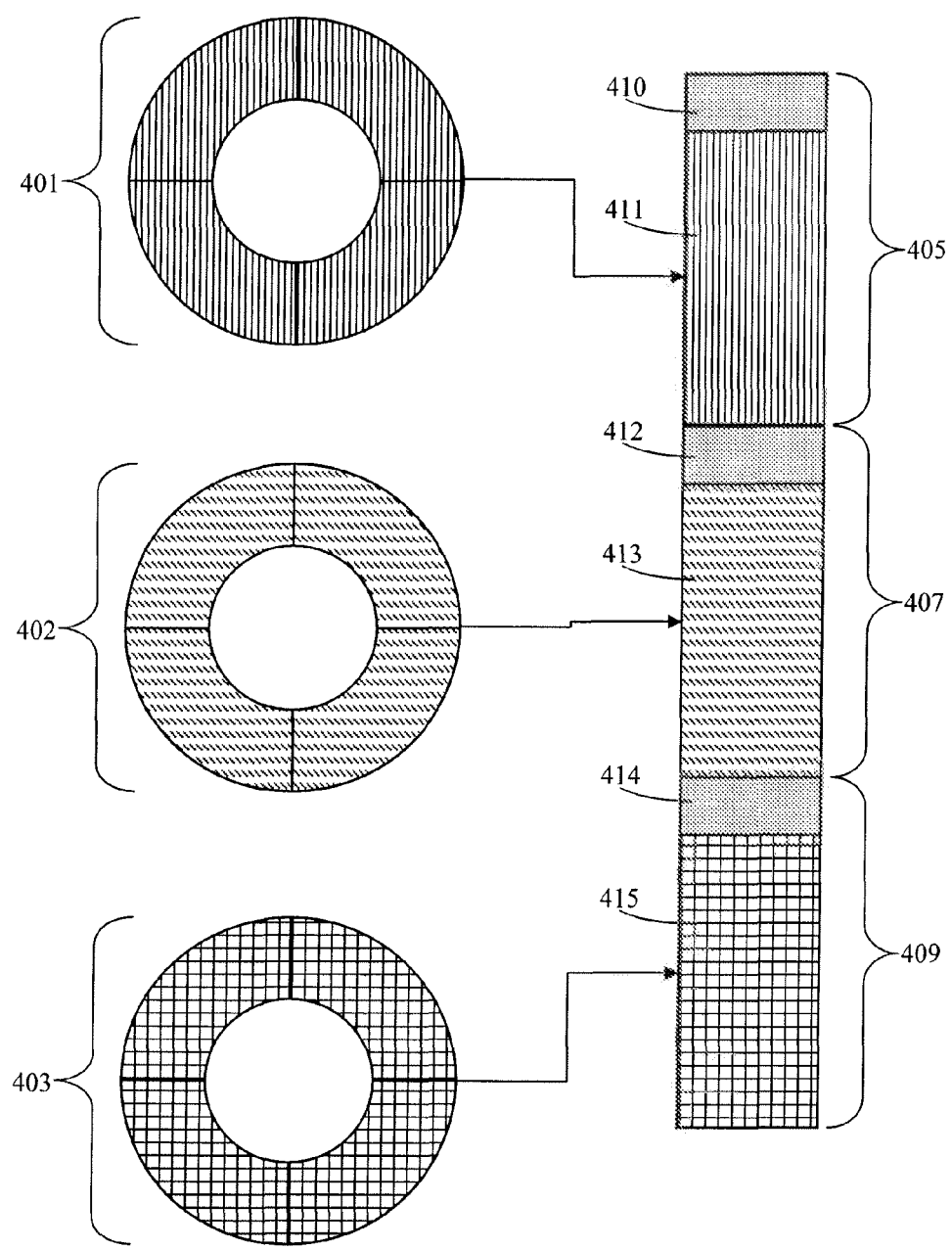
FIG. 4 is an exemplary block diagram depicting data on storage media stored using an embodiment of the present invention.

The result of the method of FIG. 3 is illustrated in FIG. 4. As shown, rather than the fragmented save sets of FIG. 2, the save sets in FIG. 4 appear as large but single chunks because the chunks are not separated by chunk headers. In FIG. 4, media record 405 contains a single record header 410 and save set 411, which may be comprised of multiple chunks streamed and flushed from its respective circular buffer 401. The record header may contain metadata about the source and contents of the respective save set. Similarly, media record 407 contains a single record header 412 and save set 413, which may be comprised of multiple chunks streamed and flushed from respective circular buffer 402. Further, media record 409 contains a single record header 414 and save set 415 stored as chunks streamed and flushed from circular buffer 403. Because the chunks from different save sets are not intermixed, there is no need to create and write chunk headers for each chunk. Instead, a single record header may precede or otherwise associate with the corresponding save set in each media record.

B. Recovery

The benefits of the present invention are especially realized during recovery. As previously discussed, recovery typically involves restoring a whole save set, rather than parts of a save set. This requires analyzing each media record on the storage media, and reading each chunk header in a media record to identify the save set from which a chunk originated. Since a save set's chunks may be separated across multiple media records, recovery also requires searching the storage media for all of the chunks from the save set, and making sure every chunk is located, recovered and streamed. As a result of this process, recovery is extremely slow.

This tedious recovery process is obviated by the method described above. FIG. 4 shows that during recovery, the BURA only needs to read a record header 410 to identify the corresponding save set 411. No additional searching for other chunks is necessary since all of the save set's chunks will be found in one media record 405 in the storage media. Similarly, media record 407 contains all of the chunks from save set 413, and media record 409 contains all of the chunks from save set 415. Record header 412 identifies save set 413 and record 414 identifies save set 415. Therefore, the recovery process becomes a simple method of streaming the data that follows the record header. As a result, recovery is much faster, more efficient and more accurate.

One will appreciate that the BURA server may also use the method of multiple circular buffers during the recovery process. Once a save set is identified and streamed from the storage media, it can be stored in a circular buffer before streaming to the client. If multiple save sets are selected for recovery, then each save set will have its own circular buffer, thereby allowing the BURA server to recover more save sets at a time. The recovered data can thereby be directed to a single client or multiple clients, depending upon the nature of the recovery request.

One will appreciate that in the description above and throughout, numerous specific details are set forth in order to provide a thorough understanding of the present invention. It will be evident, however, to one of ordinary skill in the art, that the present invention may be practiced without these specific details. For example, one will appreciate that other methods of streaming save sets or backup data to the BURA server may be contemplated without departing from this disclosure or the scope of the invention, so long as once the BURA server receives the save sets, there are each stored in their own circular buffer. In other instances, well-known structures and devices are shown in block diagram form to facilitate explanation. The description of the preferred embodiments is not intended to limit the scope of the claims appended hereto.

What is claimed is:

1. A method for storing data comprising:
   receiving, by a server, data chunks over a network connection, the data chunks being subdivisions of a save set of a plurality of save sets, each save set originating from a different device;
   creating, on the server, a plurality of circular buffers for each of the plurality of save sets, each circular buffer only including data for a corresponding save set;
   storing, on the server, received data chunks of a first save set in a first circular buffer of the plurality of circular buffers, wherein the received data chunks of the first save set are not separated by chunk headers within the first circular buffer;
   creating, by the server, a record header associated with all the data chunks of the first save set, the record header including metadata about the device from which the first save set originated;
   storing, on the server, received data chunks of a second save set in a second circular buffer of the plurality of circular buffers, wherein the received data chunks of the second save set are not separated by chunk headers within the second circular buffer; and
   in response to all of the data chunks of the first save set being stored in the first circular buffer, writing the received data chunks of the first save set and the record header to a first media record on a storage media before writing any portion of the second save set to a second media record on the storage media, the storage media being coupled to the server and comprising backup data for a plurality of client devices, the data chunks of the first save set and the record header being stored together in the first media record.

2. The method of claim 1, wherein the storage media is tape.

3. The method of claim 1, wherein the storage media is disk.

4. The method of claim 1 wherein all the data chunks of the first save set can be recovered from the first media record, and all the data chunks of the second save set can be recovered from the second media record.

5. The method of claim 1 wherein the first media record includes data from a first client and excludes data from a second client.

6. The method of claim 1 comprising:
   upon receiving a request to recover the first save set, locating on the first media record each data chunk of the plurality of data chunks from the first save set.

7. The method of claim 1 comprising:
   after the writing the contents of the first circular buffer to a first media record, upon receiving a request to recover the first save set, reading the record header associated with the first save set;
   streaming a first data chunk written to the first media record in response to the request to recover the first save set; and
   streaming a second data chunk written to the first media record after the streaming the first data chunk, wherein the first data chunk and the second data chunk are from the first save set, the first data chunk immediately follows the first record header within the first media record on the storage media, and the second data chunk immediately follows the first data chunk on the storage media.

8. A method for storing data comprising:
   receiving, by a server, data chunks over a network connection, the data chunks being subdivisions of a save set of a plurality of save sets, each save set originating from a different device;
   creating, on the server, a plurality of circular buffers for each of the plurality of save sets, each circular buffer only including data for a corresponding save set;
   storing, on the server, received data chunks of a first save set and associated record metadata for the first save set in a first circular buffer of the plurality of circular buffers, wherein the received data chunks of the first save set are not separated by chunk headers within the first circular buffer;

creating, by the server, a record header associated with all the data chunks of the first save set, the record header including metadata about the device from which the first save set originated;

storing, on the server, received data chunks of a second save set and associated record metadata for the second save set in a second circular buffer of the plurality of circular buffers, wherein the received data chunks of the second save set are not separated by chunk headers within the second circular buffer; and in response to all of the data chunks of the first save set being stored in the first circular buffer, writing the received data chunks of the first save set and the record header to storage media before writing any portion of the second save set, the storage media being coupled to the server and comprising backup data for a plurality of client devices, the data chunks of the first save set and the record header being stored together in the first media record.

9. The method of claim 8, wherein the storage media is tape.

10. The method of claim 8, wherein the storage media is disk.

11. A non-transitory computer readable medium containing computer readable instructions for storing data, the computer readable instructions comprising:

computer program code for receiving, by a server, data chunks over a network connection, the data chunks being subdivisions of a save set of a plurality of save sets, each save set originating from a different device;

computer program code for creating, on the server, a plurality of circular buffers for each of the plurality of save sets, each circular buffer only including data for a corresponding save set;

computer program code for storing, on the server, received data chunks of a first save set in a first circular buffer of the plurality of circular buffers, wherein the received data chunks of the first save set are not separated by chunk headers within the first circular buffer;

computer program code for creating, by the server, a record header associated with all the data chunks of the first save set, the record header including metadata about the device from which the first save set originated;

computer program code for storing, on the server, received data chunks of a second save set in a second circular buffer of the plurality of circular buffers, wherein received data chunks of the second save set are not separated by chunk headers within the first circular buffer; and computer program code for, in response to all of the data chunks of the first save set being stored in the first circular buffer, writing the received data chunks of the first save set and the record header to storage media before writing any portion of the second save set, the storage media being coupled to the server and comprising backup data for a plurality of client devices, the data chunks of the first save set and the record header being stored together in the first media record.

12. A non-transitory computer readable medium containing computer readable instructions for storing data, the computer readable instructions comprising:

computer program code for receiving, by a server, data chunks over a network connection, the data chunks being subdivisions of a save set of a plurality of save sets, each save set originating from a different device;

computer program code for creating, on the server, a plurality of circular buffers for each of the plurality of save sets, each circular buffer only including data for a corresponding save set;

computer program code for storing, on the server, received data chunks of a first save set and metadata for the first save set in a first circular buffer of the plurality of circular buffers, wherein the received data chunks of the first save set are not separated by chunk headers within the first circular buffer;

computer program code for creating, by the server, a record header associated with all the data chunks of the first save set, the record header including metadata about the device from which the first save set originated;

computer program code for storing, on the server, received data chunks of a second save set and metadata for the second save set in a second circular buffer of the plurality of circular buffers, wherein the received data chunks of the second save set are not separated by chunk headers within the second circular buffer; and computer program code for, in response to all of the data chunks of the first save set being stored in the first circular buffer, writing the received data chunks of the first save set and the record header to storage media before writing any portion of the second save set, the storage media being coupled to the server and comprising backup data for a plurality of client devices, the data chunks of the first save set and the record header being stored together in the first media record.

13. A system for storing data comprising:

a server with one or more processors for receiving data chunks over a network connection, the data chunks being subdivisions of a corresponding save set, each save set originating from a different device, for creating a circular buffer for each of the save sets, each circular buffer only including data for a corresponding save set, for storing received data chunks of a first save set in a first circular buffer of the created circular buffers, for creating a record header associated with all the data chunks of the first save set, the record header including metadata about the device from which the first save set originated, for storing received data chunks of a second save set in a second circular buffer of the created circular buffers, and for writing, in response to all of the data chunks of the first save set being stored in the first circular buffer, the received data chunks of the first save set and the record header to storage media before writing any portion of the second save set, wherein the first save set and the second save set are each comprised of a plurality of data chunks not separated by chunk headers, the storage media being coupled to the server and comprising backup data for a plurality of client devices, the data chunks of the first save set and the record header being stored together in a first media record.

* * * * *